United States Patent
Li et al.

(10) Patent No.: US 9,106,865 B2
(45) Date of Patent: Aug. 11, 2015

(54) MULTI-BIT ERROR DIFFUSION

(71) Applicant: XEROX CORPORATION, Norwalk, CT (US)

(72) Inventors: Xing Li, Webster, NY (US); Ryan Metcalfe, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 117 days.

(21) Appl. No.: 14/074,477

(22) Filed: Nov. 7, 2013

(65) Prior Publication Data

US 2015/0110412 A1    Apr. 23, 2015

Related U.S. Application Data

(62) Division of application No. 14/057,509, filed on Oct. 18, 2013.

(51) Int. Cl.
H04N 1/52 (2006.01)
H04N 1/405 (2006.01)
H04N 1/409 (2006.01)

(52) U.S. Cl.
CPC ............ *H04N 1/4052* (2013.01); *H04N 1/409* (2013.01)

(58) Field of Classification Search
USPC .............. 382/252; 358/1.9, 3.03, 3.23
See application file for complete search history.

(56) References Cited

U.S. PATENT DOCUMENTS

| | | | |
|---|---|---|---|
| 5,367,383 A * | 11/1994 | Godshalk et al. | 382/239 |
| 6,563,957 B1 * | 5/2003 | Li et al. | 382/252 |
| 6,686,922 B2 * | 2/2004 | Loce et al. | 345/596 |
| 7,319,549 B2 * | 1/2008 | Thakur | 358/3.03 |
| 7,486,834 B2 * | 2/2009 | Bailey et al. | 382/252 |
| 7,982,916 B2 * | 7/2011 | Spaulding et al. | 358/3.03 |
| 8,248,659 B2 * | 8/2012 | Gotoh et al. | 358/3.03 |
| 8,437,043 B2 | 5/2013 | Ebner et al. | |
| 8,483,502 B2 * | 7/2013 | Yoshizawa | 382/252 |
| 2001/0021041 A1 * | 9/2001 | Suzuki | 358/458 |
| 2005/0225806 A1 * | 10/2005 | Damera-Venkata | 358/3.03 |
| 2013/0135338 A1 * | 5/2013 | Gille et al. | 345/596 |

* cited by examiner

*Primary Examiner* — Ishrat I Sherali
(74) *Attorney, Agent, or Firm* — MH2 Technology Law Group LLP

(57) ABSTRACT

The present invention generally relates to systems and methods for error diffusion, e.g., for use in a halftone process. The described techniques are faster than known techniques in that they utilize fewer computations on average. Consequently, the described techniques can be more readily implemented in software, for example, though the described techniques are not limited to software.

20 Claims, 5 Drawing Sheets

| TABLE INDEX | INPUT + ERROR | TABLE ENTRY OUTPUT PIXEL | TABLE ENTRY OUTPUT ERROR |
|---|---|---|---|
| 0 | -8 | 0 | -8 |
| 1 | -7 | 0 | -7 |
| 2 | -6 | 0 | -6 |
| 3 | -5 | 0 | -5 |
| 4 | -4 | 0 | -4 |
| 5 | -3 | 0 | -3 |
| 6 | -2 | 0 | -2 |
| 7 | -1 | 0 | -1 |
| 8 | 0 | 0 | 0 |
| 9 | 1 | 0 | 1 |
| 10 | 2 | 0 | 2 |
| 11 | 3 | 0 | 3 |
| 12 | 4 | 0 | 4 |
| 13 | 5 | 0 | 5 |
| 14 | 6 | 0 | 6 |
| 15 | 7 | 0 | 7 |
| 16 | 8 | 0 | 8 |
| 17 | 9 | 0 | -8 |
| 18 | 10 | 1 | -7 |
| 19 | 11 | 1 | -6 |

MULTI-BIT ERROR DIFFUSION

RELATED APPLICATION

This application claims priority as a divisional application of U.S. patent application Ser. No. 14/057,509, entitled, "Multi-Bit Error Diffusion" to Li et al., filed Oct. 18, 2013, the disclosure of which is expressly incorporated by reference herein in its entirety.

FIELD OF THE INVENTION

This invention relates generally to error diffusion for use with, for example, a halftone process.

SUMMARY

According to various embodiments, a method for reducing a number of bits representing pixels in an electronic image is presented. The method includes obtaining an electronic image including a plurality of N-bit pixel values. The method also includes generating, for each of the plurality of N-bit pixel values, an M-bit pixel value, where M<N. The generating includes: determining a least significant bit part as a remainder of dividing the N-bit pixel value by a base, determining a most significant bit part as an integer part of a quantity obtained by dividing the N-bit pixel value by the base, applying binary error diffusion to the least significant bit part, such that an output bit is obtained, and providing an M-bit pixel value as a capped sum of the most significant bit part and the output bit. The method further includes providing an output image including a plurality of M-bit pixel values obtained from the generating.

Various optional features of the above embodiments include the following. The method can include storing the fixed integer base in electronic memory, where the fixed integer base is less than N. The value of M can be greater than 1 or equal to 1. The value of N can be greater than 4 or equal to 4. The providing an output image can include at least one of storing in electronic memory, communicating using an electronic communication channel, and printing on to physical paper. The electronic image and the output image can be greyscale. The applying binary error diffusion can further include distributing an output error to at least one adjacent pixel. The method can include, storing an error value in an error buffer for each of the plurality of N-bit pixel values.

According to various embodiments, a system for reducing a number of bits representing pixels in an electronic image is presented. The system includes at least one electronic processor configured to obtain an electronic image including a plurality of N-bit pixel values. The at least one electronic processor is further configured to generate, for each of the plurality of N-bit pixel values, an M-bit pixel value, where M<N. The generating can include determining a least significant bit part as a remainder of dividing the N-bit pixel value by a base, determining a most significant bit part as an integer part of a quantity obtained by dividing the N-bit pixel value by the base, applying binary error diffusion to the least significant bit part, such that an output bit is obtained, and providing an M-bit pixel value as a capped sum of the most significant bit part and the output bit. The at least one electronic processor is further configured to provide an output image including a plurality of M-bit pixel values.

Various optional features of the above embodiments include the following. The at least one electronic processor can be further configured to store the fixed integer base in electronic memory, where the fixed integer base is less than N. The value of M can be greater than 1 or equal to 1. The value of N can be greater than 4 or equal to 4. The at least one electronic processor can be further configured to perform at least one of: storing in electronic memory, communicating using an electronic communication channel and printing on to physical paper. The electronic image and the output image can be greyscale. The at least one electronic processor can be further configured to distribute an output error to at least one adjacent pixel. The at least one electronic processor can be further configured to store an error value in an error buffer for each of the plurality of N-bit pixel values.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

General techniques for reducing a number of bits used to represent each pixel in an electronic image are known. Such techniques can be used in, for example, a multi-function device capable of printing paper copies of electronic images and reproducing paper copies of paper images.

A naïve technique for reducing a number of bits used to represent each pixel in an electronic image can include simply removing a number of bits used to represent of each pixel value. However, this naïve technique greatly reduces the quality of the image.

Another known but naïve technique for reducing a number of bits representing pixel values in an image includes quantizing each pixel value according to pre-defined thresholds. For example, reducing an 8-bit image to a 2-bit image can include comparing each 8-bit pixel value to the thresholds of 0, 42, 127, 212, and 255. If a given 8-bit pixel value lies in the range [0, 42] then it gets mapped to the value 0, if it lies within [43, 127] then it gets mapped to the value 1, if it lies within [128, 212] then it gets mapped to 2, and if lies within [213, 255] then it gets mapped to 3. However, this process requires, on average, multiple comparisons for each pixel value, and comparisons are electronic processor intensive. Moreover, because this example process loses information, the resulting image can suffer in terms of quality. Thus, techniques for reducing a number of bits representing pixel values can utilize error diffusion in order to improve quality when information is lost. An example known technique for error diffusion is discussed below in reference to FIG. 1.

Figures 1, 2A:
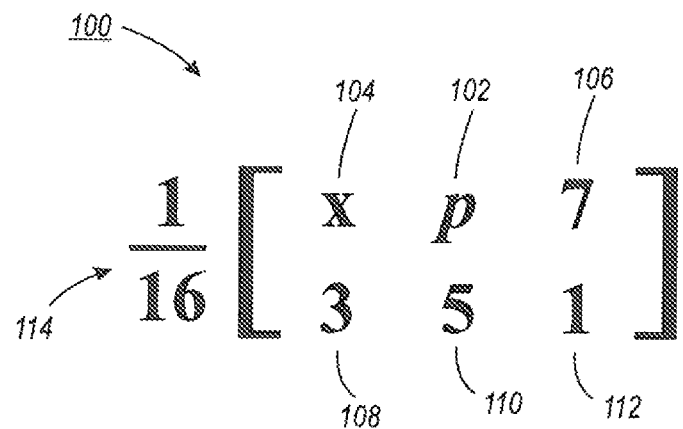
FIG. 1 is a schematic diagram of an error diffusion matrix according to some embodiments.
FIGS. 2A and 2B include a schematic diagram of a lookup table according to some embodiments.

FIG. 1 is a schematic diagram of an error diffusion matrix according to some embodiments. Matrix 100 can be used to diffuse error to neighboring pixel values, which generally results in improved image quality in comparison to techniques that lack error diffusion.

For example, consider applying the threshold quantization technique discussed above to a rectangular 8-bit image in order to reduce it to a 2-bit image. The technique can be applied to each pixel in the image sequentially, starting with the pixel in upper left-hand corner of the image and continuing along the row to the right side of the image. Once the right side is reached, the technique continues on to the next row down, processing pixels left to right, until each row is complete. That is, the technique can proceed in a raster fashion. As each pixel is processed by comparing it to the ranges defined by thresholds, the pixel value gets quantized such that it can be represented using 2-bits.

Continuing this example, consider a pixel with an 8-bit pixel value of 100. As discussed above, if an 8-bit pixel value lies in the range [0, 42] then it gets mapped to the value 0, if it lies within [43, 127] then it gets mapped to the value 1, if it lies within [128, 212] then it gets mapped to 2, and if lies within [213, 255] then it gets mapped to 3. Because reducing 8 bits to 4 bits loses information, techniques can determine the error that arises from quantization. In particular, the error can be calculated by comparing original values for each range to corresponding representative values from each range. The corresponding 8-bit pixel value for the range [0, 42] is 0, the corresponding 8-bit pixel value for the range [43, 127] is 85, the corresponding 8-bit pixel value for the range [128, 212] is 170, and the corresponding 8-bit pixel value for the range [213, 255] is 255. In this example, the 8-bit pixel value of 100 lies within the range [43, 127], thus, the assigned 2-bit pixel value is 1, and the corresponding 8-bit pixel value is 85. This change thus introduces an error of $100-85=15$.

Matrix 100 can be used distribute this error to adjacent pixels as follows. The pixel under consideration is represented in matrix 100 by the symbol "p" (102). The pixel in the same row to the left, represented by the symbol "x" (104) has already been processed, so no error is distributed to it. (Note that the first pixel in an image, i.e., the upper right-hand corner pixel, does not receive diffused error when using matrix 100.) The pixel in the same row as the pixel being processed, but to the right, is represented in matrix 100 by the number "7" (106), which is multiplied by the coefficient fraction $\frac{1}{16}$ (114). Thus $\frac{7}{16} \cdot 15 = 6.5625 \approx 6$ is accrued as accumulated error for the pixel to the right of the pixel currently being processed. (In some embodiments, the decimal part of the distributed error can be omitted; in other embodiments, the distributed error is rounded in the usual manner. For purposes of explanation, this example utilizes truncation.) The pixel in the next row and to the left is represented in matrix 100 by the number 3 (108), thus $\frac{3}{16} \cdot 15 = 2.8125 \approx 2$ is accrued as accumulated error for this pixel value. The pixel directly under the pixel being processed is represented in matrix 100 by the number 5 (110), thus $\frac{5}{16} \cdot 15 = 4.6875 \approx 4$ is accrued as accumulated error for this pixel value. And the pixel below and to the right of the pixel being processed is represented in matrix 100 by the number 1 (112), thus $\frac{1}{16} \cdot 15 = 0.9375 \approx 0$ is accrued as accumulated error for this pixel value. Once the error of 15 is distributed to the adjacent pixels as explained above, the processing moves to the next pixel in the row. In other words, matrix 100 is applied to the next pixel in the row to distribute the error from quantizing that pixel value, and so on, in a raster manner, until each pixel is processed. Note that each pixel can accumulate error, positive or negative, from multiple adjacent pixels. To process a pixel, the accumulated error is first subtracted from the pixel value.

As should be apparent from the above discussion, known techniques for error diffusion, e.g., using matrix 100, are processor intensive, requiring substantial amounts of processing power to compute the comparisons, multiplications, divisions, and subtractions for each pixel. That is, for multi-bit error diffusion known techniques have the added steps of comparing the input against a set of multiple thresholds to determine the output value, before the error calculation is even performed. In contrast, the error diffusion techniques presented herein require substantially less electronic processing power that known error diffusion techniques, without sacrificing image quality. Thus, implementations of the present invention can provide fast, efficient error diffusion that requires much less electronic processing power than existing techniques, without significantly degrading the image. These techniques are discussed below in reference to FIGS. 2-5.

Figure 2B:
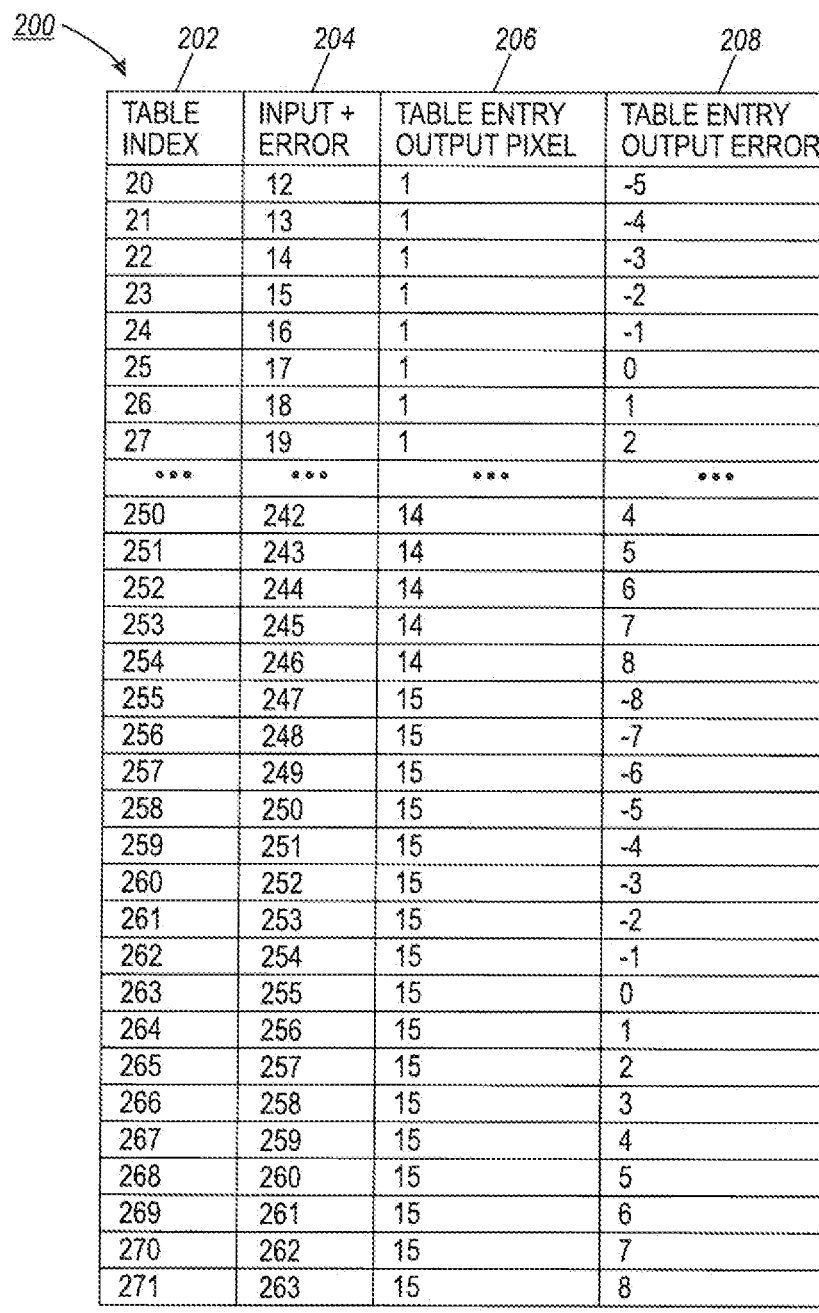

FIGS. 2A and 2B include a schematic diagram of a lookup table according to some embodiments. Lookup table 200 is used in some embodiments not only to reduce a number of bits used to represent pixel values, but also to determine an error value to be distributed. That is, instead of performing a series of comparisons to derive a reduced-bit-number pixel value, and then performing a subtraction to determine an error value, use of lookup table 100 determines both an output pixel value and an associated error using far fewer steps. Use of lookup table 100 is discussed presently.

Table 200 can be used to obtain a 4-bit image from an 8-bit image. This can be achieved by processing each pixel value by looking up a related value in the table. In general, because reducing a number of bits from 8 to 4 using matrix 100 of FIG. 1 can produce errors of up to ±8, the related value can be an error-corrected original pixel value plus 8, so that the result is non-negative and can therefore be efficiently stored electronically. This related value is then looked up in table index column 202, the value of the output pixel value is retrieved from table entry output pixel column 206, and the output error is retrieved from table entry output error column 208. (Input+error column 204 is included for reference purposes herein, and is not in general needed for implementations.)

The electronic processing system can maintain an error buffer, configured to store accumulated error values associated with each pixel. Such an error buffer can be implemented using, e.g., random access memory.

The following provides an example of using table 100 to process a pixel. In this example, assume without loss of generality that the 8-bit value of the pixel being processed is 5, and that the pixel has already accumulated an error of −7. The process can retrieve the pixel value of 5 from the memory location in which the image is stored, retrieve the accumulated error of −7 from the error buffer, then sum those values along with the fixed offset value of 8, to obtain the related value of 6. The process looks up the related value 6 in table index column 202, and retrieves both an output pixel value of 0 from table entry output pixel column 206 and an error value of −2 from table entry output error column 208. The process then utilizes the output pixel value, e.g., by storing in a different memory location associated with the resulting 4-bit image. The process also distributes the error value of −2 to adjacent pixels, e.g., using matrix 100 of FIG. 1. The process then moves on to the next pixel, and so on, until each pixel has been processed and a new image that utilizes only 4-bit pixel values is obtained.

Though table 100 can be used to reduce 8-bit pixel values to 4-bit pixel values, other reductions are possible, e.g., by way of non-limiting examples, 32 bits to 8 bits, 32 bits to 4 bits, 32 bits to 1 bit, 16 bits to 8 bits, 16 bits to 4 bits, 16 bits to 1 bit, 8 bits to 4 bits, 8 bits to 1 bit, or 4 bits to 1 bit. Table analogous to table 100 can be used for such conversions. Such tables can be generated by those of skill in the art in light of this disclosure by following the general pattern apparent in table 100 and adjusting the offset value.

Figure 3:
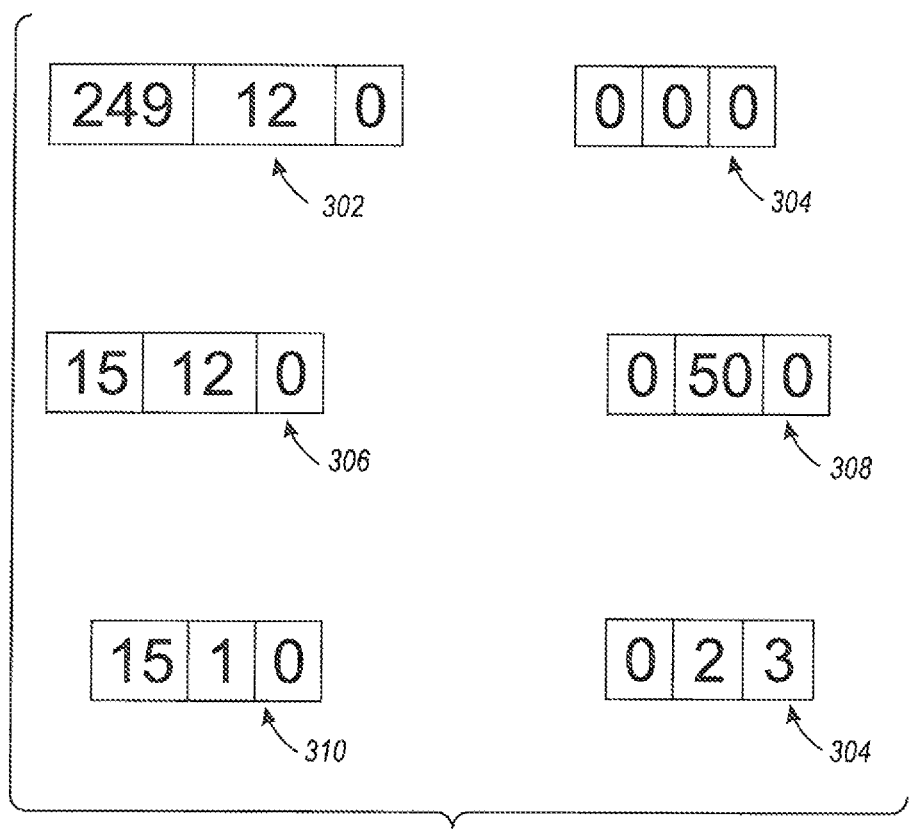
FIG. 3 is a schematic representation of a portion of an error diffusion process according to some embodiments.

FIG. 3 is a schematic representation of a portion of an error diffusion process according to some embodiments. In particular, FIG. 3 depicts portions of two processing steps applied to a 8-bit image portion 302 and associated error buffer portion 304. At each step, a 8-bit pixel value is replaced with a 4-bit pixel value using matrix 100 of FIG. 1 and lookup table 200 of FIGS. 2A and 2B. Initially, image portion 302 includes value 249 in its leftmost entry, and an associated error of 0 as seen in error buffer portion 304. Using lookup table 200, the related value of 257 (249 plus an offset of 8 plus an accumulated error of 0 from error buffer 304) maps to an output pixel value of 15 and an error of −6. The output pixel value of 15 replaces the input value of 249 in image portion 306. For the error to be distributed to pixel value to the right, the error of −6 is multiplied by 7/16 as determined by matrix 100, and the resulting value of −2,625 is truncated to −2 and distributed to the next pixel as shown in error buffer portion 308. This completes the first step.

For the second step, the second pixel value of 12 from image portion 306 is processed. Using lookup table 200, the related value of 18 (12 plus an offset of 8 plus an accumulated error of −2 from error buffer 308) maps to an output pixel value of 1 and an error of −7. The output pixel value of 1 replaces the input pixel value of 12 in image portion 310. To determine the error to be distributed to the value of the pixel to the right, the error of −7 is multiplied by 7/16, and the resulting value of −3.0625 is truncated to −3 and distributed to the next pixel as shown in error buffer portion 312. This completes the example of portions of two steps applied to a portion of an image.

Although FIG. 3 depicts replacing 8-bit values with 4-bit values, the 4-bit values could alternately, or in addition, be inserted into new memory locations such that a new, 4-bit image file is generated.

Figure 4:
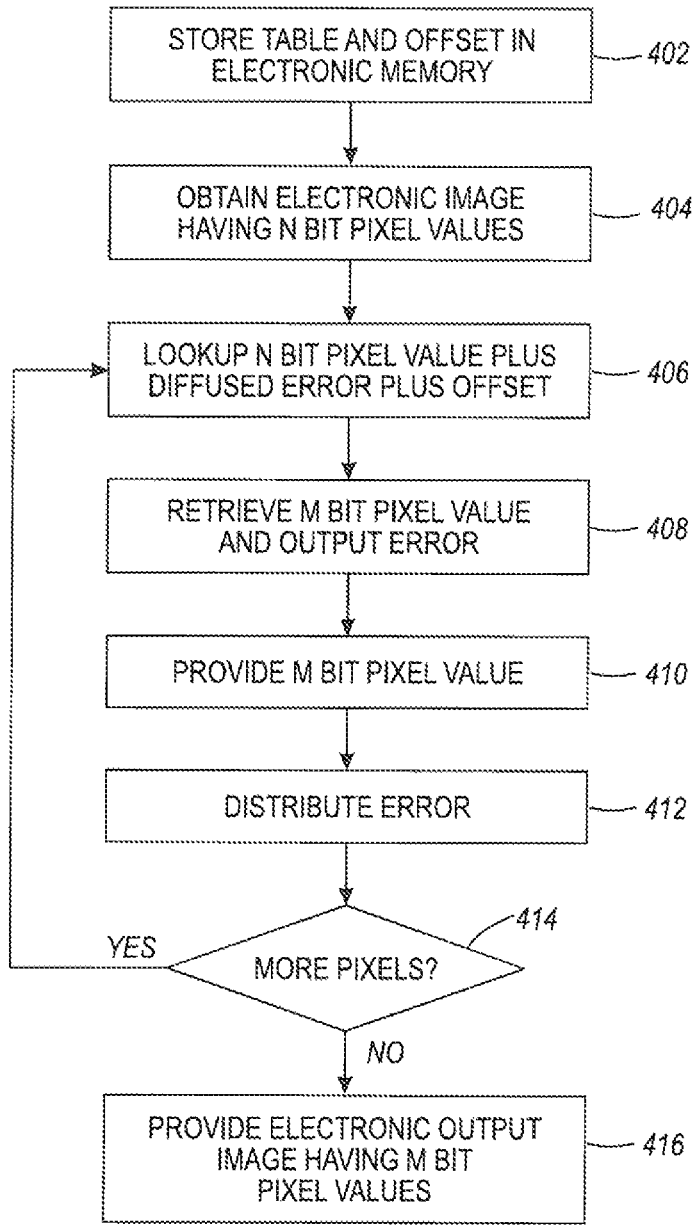
FIG. 4 is a flowchart of an error diffusion process according to some embodiments.

FIG. 4 is a flowchart of an error diffusion process according to some embodiments. In particular, the error diffusion process depicted in FIG. 4 is described in reference to FIGS. 1-3.

At block 402, the technique stores a table and offset in electronic memory. The table can be, e.g., table 100 of FIG. 1 or a different table used for different bit reduction numbers. The offset can be, e.g., 8, for reductions from 8-bit pixel values to 4-bit pixel values, or a different quantity for other reductions.

At block 404, the technique obtains an electronic image having N-bit pixel values. Here, N can be any power of 2, for example. Obtaining an electronic image can occur by, e.g., receiving over a communication channel, retrieving from electronic memory, or obtaining from a scan of a physical paper.

In some embodiments, blocks 406-412 are repeated for each pixel in the image.

At block 406, the technique looks up a value related to the input N-bit pixel value. The related value can be, e.g., the input N-bit pixel value plus a diffused error. The lookup can occur using, e.g., table 200 of FIGS. 2A and 2B or an analogous table constructed using the pattern apparent in table 200.

At block 408, the technique retrieves an M-bit pixel value and an output error based on the lookup of block 406. The retrieval can occur using, e.g., table 200 of FIGS. 2A and 2B or an analogous table constructed using the pattern apparent in table 200.

At block 410, the technique provides an M-bit pixel value. The providing can occur by, e.g., replacing an existing N-bit pixel value or inserting the M-bit pixel value into a different memory section such that an M-bit image is constructed.

At block 412, the retrieved error is distributed, e.g., using matrix 100 of FIG. 1 or an analogous matrix.

At block 414, the technique determines whether additional pixels need to be processed. If so, the process returns to block 406. If not, the process proceeds to block 416.

At block 416, the process provides an output image having M-bit pixel values. The providing can occur by, e.g., storing such an image in memory, communicating the image using an electronic communication channel, or printing the image onto physical paper.

Figure 5:
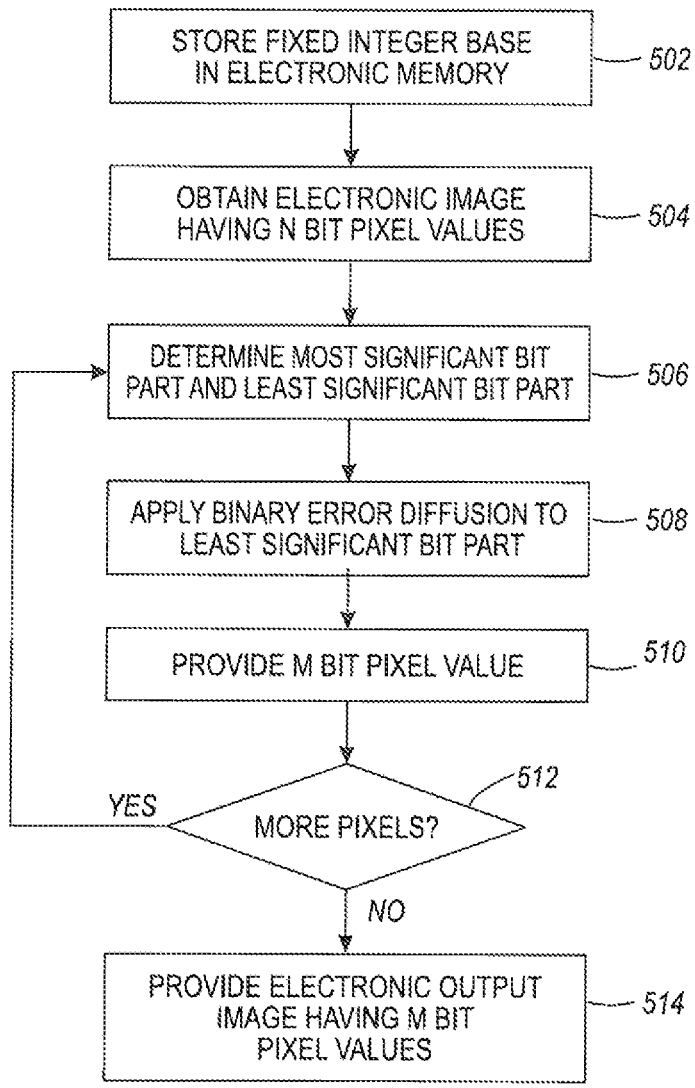
FIG. 5 is a flowchart of an error diffusion process according to some embodiments.

FIG. 5 is a flowchart of an error diffusion process according to some embodiments. The process of FIG. 5 is an alternative technique to that depicted in reference to FIGS. 3 and 4, but it still utilizes a matrix such as that of FIG. 1. The process of FIG. 5 can be implemented to reduce a number of bits used to represent each pixel in an electronic image from any number to any smaller number.

At block 502, the technique stores a fixed integer base in electronic memory. For reducing from 8 bits to 4 bits, the fixed integer base can be, e.g., 17. Other reductions can use other bases.

At block 504, the technique obtains an electronic image having N-bit pixel values. Here, N can be any exponent of 2, for example. The obtaining can occur by, e.g., receiving over a communication channel, retrieving from electronic memory, or obtaining from a scan of a physical paper.

In some embodiments, blocks 506-512 are repeated for each pixel in the image.

At block 506, the technique determines a least significant bit part and a most significant bit part of the bits representing each pixel in the image. This block can involve partitioning each block of bits that represent a pixel into two parts. In some embodiments, the most significant bit part is determined as the integer part of the quantity obtained by dividing the input pixel value by the base, e.g., as $\lfloor V_{in} \div B \rfloor$, where $V_{in}$ is the input pixel value, B is the base selected at block 502, and the quantity enclosed in brackets $\lfloor \cdot \rfloor$ is stripped of any value after the decimal, i.e., truncated to the integer part. In such embodiments, the least significant bit part is determined as the remainder after dividing the input pixel value by the base, e.g., as $V_{in}$ mod B, where $V_{in}$ is the input pixel value, B is the base selected at block 502, and "mod" denotes the modular arithmetic function, which provides a remainder after dividing the first argument by the second. Note that a calculation that produces the same result for the least significant bit portion is $V_{in} - MSB \cdot B$, where $V_{in}$ is the input pixel value, B is the base selected at block 502, and MSB is the determined most significant bit portion of $V_{in}$. In general, the most significant bit part can be chosen to have the same number of bits as each pixel representation in the output image, e.g., M bits.

At block 508, the technique applies binary error diffusion to the least significant bit part, i.e. error diffusion for reducing a number of bits to 1. The error diffusion applied at block 508 can be any known technique for error diffusion. The result of block 508 is either a 0 or a 1 for each pixel. These values can be stored in an electronic buffer.

At block 510, the technique provides an M-bit pixel value. The provision of M-bit pixel values can proceed by summing the M-bit most significant bit portion with the output of block 508, capping the sum at the maximum number that can be represented using M bits. For example, if an 8-bit most significant bit portion as determined at block 506 is 10001001 and the output of block 508 for the same block is 1, then the output of block 510 is 10001010. As another example, if a 4-bit most significant bit portion is 1111, and the output of block 508 for the same pixel is 1, then the output of block 510 is 1111.

At block 512, the technique determines whether each pixel has been processed. If not, then the process returns to block 506. If so, then the process proceeds to block 514.

At block 514, the process provides an output image having M-bit pixel values. The providing can occur by, e.g., storing such an image in memory, communicating the image using an electronic communication channel, or printing the image onto physical paper.

Certain embodiments described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations, in particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method for reducing a number of bits representing pixels in an electronic image, the method comprising:
    obtaining an electronic image comprising a plurality of N-bit pixel values;
    generating, for each of the plurality of N-bit pixel values, an M-bit pixel value, wherein M<N, wherein the generating comprises:
        determining a least significant bit part as a remainder of dividing the N-bit pixel value by a base;
        determining a most significant bit part as an integer part of a quantity obtained by dividing the N-bit pixel value by the base;
        applying binary error diffusion to the least significant bit part, whereby an output bit is obtained;
        providing an M-bit pixel value as a capped sum of the most significant bit part and the output bit; and
    providing an output image comprising a plurality of M-bit pixel values obtained from the generating.

2. The method of claim 1, further comprising storing the fixed integer base in electronic memory, wherein the fixed integer base is less than N.

3. The method of claim 1, wherein M=1.

4. The method of claim 1, wherein M>1.

5. The method of claim 1, wherein N=4.

6. The method of claim 1, wherein N>4.

7. The method of claim 1, wherein the providing an output image comprises at least one of: storing in electronic memory, communicating using an electronic communication channel, and printing on to physical paper.

8. The method of claim 1, wherein the electronic image and the output image are greyscale.

9. The method of claim 1, wherein the applying binary error diffusion further comprises distributing an output error to at least one adjacent pixel.

10. The method of claim 1, further comprising storing an error value in an error buffer for each of the plurality of N-bit pixel values.

11. A system for reducing a number of bits representing pixels in an electronic image, the system comprising at least one electronic processor configured to:
    obtain an electronic image comprising a plurality of N-bit pixel values;
    generate, for each of the plurality of N-bit pixel values, an M-bit pixel value, wherein M<N, by:
        determining a least significant bit part as a remainder of dividing the N-bit pixel value by a base;
        determining a most significant bit part as an integer part of a quantity obtained by dividing the N-bit pixel value by the base;
        applying binary error diffusion to the least significant bit part, whereby an output bit is obtained;
        providing an M-bit pixel value as a capped sum of the most significant bit part and the output bit; and
    provide an output image comprising a plurality of M-bit pixel values.

12. The system of claim 11, wherein the at least one electronic processor is further configured to store the fixed integer base in electronic memory, wherein the fixed integer base is less than N.

13. The system of claim 11, wherein M=1.

14. The system of claim 11, wherein M>1.

15. The system of claim 11, wherein N=4.

16. The system of claim 11, wherein N>1.

17. The system of claim 11, wherein the at least one electronic processor is further configured to perform at least one of: storing in electronic memory, communicating using an electronic communication channel, and printing on to physical paper.

18. The system of claim 11, wherein the electronic image and the output image are greyscale.

19. The system of claim 11, wherein the at least one electronic processor is further configured to distribute an output error to at least one adjacent pixel.

20. The system of claim 11, wherein the at least one electronic processor is further configured to store an error value in an error buffer for each of the plurality of N-bit pixel values.

* * * * *